United States Patent [19]

Kinbara et al.

[11] 4,406,644
[45] Sep. 27, 1983

[54] POWER TRANSMISSION SYSTEM

[75] Inventors: Hiroji Kinbara, Aichi; Yoshiyuki Hattori, Toyoake; Kazuma Matsui, Toyohashi; Hideyuki Hayakawa, Nishio; Masaaki Takizawa, Mishima; Masaru Tamura; Yasunobu Jufuku, both of Susono, all of Japan

[73] Assignees: Nippondenso Co., Ltd., Kariya; Toyota Jidosha Kogyo Kabushiki Kaisha, Toyoda, both of Japan

[21] Appl. No.: 223,304

[22] Filed: Jan. 8, 1981

[30] Foreign Application Priority Data

Jan. 9, 1980 [JP] Japan .................................. 55-1482

[51] Int. Cl.³ ............................................. F16H 11/06
[52] U.S. Cl. ..................................................... 474/13
[58] Field of Search ............................ 474/11, 13, 15; 192/103 A, 103 C, 105 B

[56] References Cited

U.S. PATENT DOCUMENTS

| | | | |
|---|---|---|---|
| 2,987,934 | 6/1961 | Thomas | 474/15 X |
| 3,118,311 | 1/1964 | Francis | 474/13 |
| 3,599,504 | 8/1971 | Taylor | 474/15 X |

FOREIGN PATENT DOCUMENTS 2034421 6/1980 United Kingdom .

*Primary Examiner*—Lawrence J. Staab
*Assistant Examiner*—Michael D. Bednarek
*Attorney, Agent, or Firm*—Cushman, Darby & Cushman

[57] ABSTRACT

A torque transmission system has driving and driven pulley units around which an endless V-belt extends. Each pulley unit has a stationary pulley part rotatable with a shaft and a movable pulley part disposed to define with the stationary pulley part a circumferentially continuous groove for receiving the V-belt. The movable pulley parts of the pulley units are axially resiliently biased so that the radii of the circle along which the V-belt engages the driving and driven pulley units are varied to change the speed-change ratio of the transmission system. The movable pulley part of the driven pulley unit is axially shifted by the action of fly weights held between a stationary plate fixed to the shaft and a holder fixed to the movable pulley part. A cover is provided to cover the outer end of the movable pulley part, the stationary plate and an adjacent end of the shaft and cooperates with the stationary plate to define therebetween a first space which is communicated through a port in the stationary plate with a second space defined between the stationary plate and the holder. The first space is also communicated with the atmosphere through an axial bore extending axially through the shaft. A third space defined between the stationary and movable pulley parts is communicated with the axial bore through a second communication port formed radially in the shaft, whereby the three spaces are maintained substantially at the atmospheric pressure regardless of changes of the volumes of the spaces due to axial movements of the axially movable members, so that the torque transmission system can be free from any adverse effect which would otherwise be caused by the compression of air in the mentioned spaces.

3 Claims, 4 Drawing Figures

POWER TRANSMISSION SYSTEM

BACKGROUND OF THE INVENTION

1. Field of the Invention

The present invention relates to a torque transmission system of the type which utilizes driving and driven pulley units and an endless V-belt to transmit the torque of a shaft to another shaft. The transmission system of the present invention can be used, for example, to transmit the torque of an automotive engine to an auxiliary rotary devices or accessories, such as air pump, water pump, fan, compressor, alternator or the like.

In co-pending U.S. patent application Ser. No. 140,594 filed by Hattori et al on Apr. 15, 1980, there is disclosed a torque transmission system having driving and driven pulley units drivingly connected together by an endless V-belt. Each of the driving and driven pulley units has a stationary pulley rotatable with a shaft and a movable pulley disposed to define with the stationary pulley a circumferentially continuous groove for receiving the V-belt. The movable pulleys of the two pulley units are axially resiliently biased so that the radii of the circles along which the V-belt engages the driving and driven pulley units are varied to change the speed-change ratio of the transmission system. The driven pulley unit includes fly weights which are rotatable with the movable pulley of the driven pulley unit and centrifugally displaced radially outwardly to axially shift the movable pulley. The driving and driven pulley units are provided with cam mechanisms each comprising a cam member and a follower member. When the load on the driven pulley unit is suddenly varied, the cam mechanisms are operative to keep the rotational speed of the driven pulley unit constant irrespective of variation in the load on the driven pulley unit.

2. Summary of the Invention

The present invention has its object to provide an improved power transmission system.

The power transmission system according to the present invention comprises a shaft; a stationary pulley part fixed to said shaft; a movable pulley part disposed in axially opposite relationship to said stationary pulley part and movable in the axial direction along said shaft toward and away from said stationary pulley part to vary the width of a belt-receiving groove formed between said stationary and movable pulley parts; a V-blet received in said belt-receiving groove; a holder fixed to the side of said movable pulley part opposite to the side thereof which is contacted by said V-belt, said holder having an inclined surface extending obliquely with respect to the axis of said shaft; a stationary plate fixed to said shaft and disposed axially outwardly of said holder; at least one fly weight held between said stationary plate and said holder; a cover disposed axially outwardly of said stationary plate and covering the same, said cover cooperating with said stationary plate to define a first space therebetween, said stationary plate cooperating with said movable pulley part to define a second space therebetween, said movable and stationary pulley parts cooperating together to define a third space therebetween; means for communicating said first, second and third spaces with the atmosphere to maintain said spaces substantially at the atmospheric pressure.

The communication means may preferably comprise a first communication port formed in the stationary plate to provide a communication between the first and second spaces, an axial bore formed axially in the shaft to provide a communication between the first space and the atmosphere and a second communication port formed substantially radially in the shaft to provide a communication between the third space and the axial bore. The first communication port may preferably be formed in the stationary plate adjacent to the shaft.

As mentioned above, the first to third spaces in the torque transmission system according to the present invention are communicated with the atmosphere and, therefore, are maintained substantially at the atmospheric pressure regardless of the changes of the volumes of the spaces due to axial movements of the axially movable members. Accordingly, the transmission system can advantageously be free from any adverse effect which would otherwise be caused by the compression of air in the mentioned spaces when the volumes of these spaces are reduced.

The above and other objects, features and advantages of the present invention will be made apparent by the following description with reference to the accompanying drawings.

DESCRIPTION OF THE PREFERRED EMBODIMENT

Figure 1:
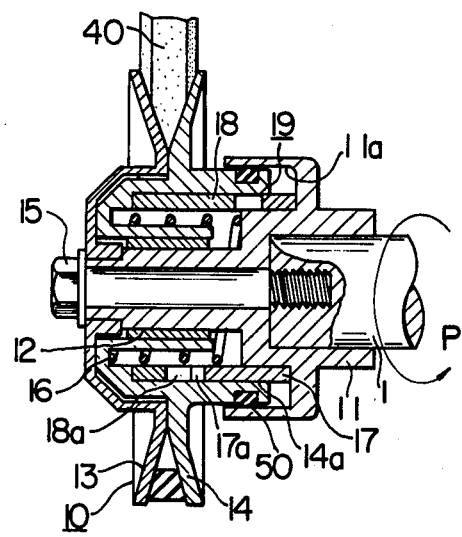
FIGS. 1 and 2 are sectional views of driving and driven pulley units of a power transmission system constructed in accordance with a first embodiment of the invention.

Referring first to FIG. 1, a reference numeral 1 designates a drive shaft which, in the illustrated embodiment of the invention, is a crank shaft of an automobile engine adapted to rotate in the direction designated by a symbol P. A main shaft 11 is fixed to the drive shaft 1 by means of a bolt 15 and a key which is not shown. A dry bearing 12 is inserted into the bore of a movable pulley part 14 so that the bearing is slidable with the movable pulley part 14 along the main shaft 11 in the axial direction thereof. A reference numeral 13 designates a stationary pulley part which is fixed to the main shaft 11 by means of a bolt 15 and a key, not shown. The stationary pulley part 13 and the movable pulley part 14 constitute a driving pulley unit generally designated by a reference numeral 10. It will be seen that the width and radius of the groove formed between both pulley parts of the drive pulley unit 10 are variable. A preloaded spring 16 acts to bias the movable pulley part 14 toward the stationary pulley part 13, i.e., in the direction to reduce the width of the groove formed between the two pully parts. For diminishing the weight of the power transmission system, the stationary and movable pulley parts 13 and 14 are preferably made of a light-weight metal, such as an aluminum alloy.

A stationary cam 17 is fixed to the main shaft 11 and has a cam surface 17a, while a movable cam 18 is fixed to the movable pulley part 14 and has a cam surface 18a of the same angle as the cam surface 17a of the stationary cam 17. The stationary cam 17 and the movable cam 18 in combination constitute a cam mechanism 19. The cam surfaces 17a and 18a are kept in contact with each other so that, when a relative movement is caused in the rotational direction between two cams 17 and 18, an axial thrust force is generated and acts on the cam surfaces 17a and 18a in accordance with the load torque by which the above-mentioned relative movement is caused. The magnitude of this axial thrust force is determined also by the angle of the inclination of the cam surfaces.

A reference numeral 50 denotes an oil seal fitted in a groove 14 formed in the movable pulley part 14a. The outer peripheral surface of the oil seal 50 is in sliding contact with the inner peripheral surface 11a of a cylindrical portion of the main shaft 11 to prevent the lubricating oil for the cam surfaces 17a and 18a of the cams 17 and 18 from flowing out of the driving pulley unit described above.

Figure 2:
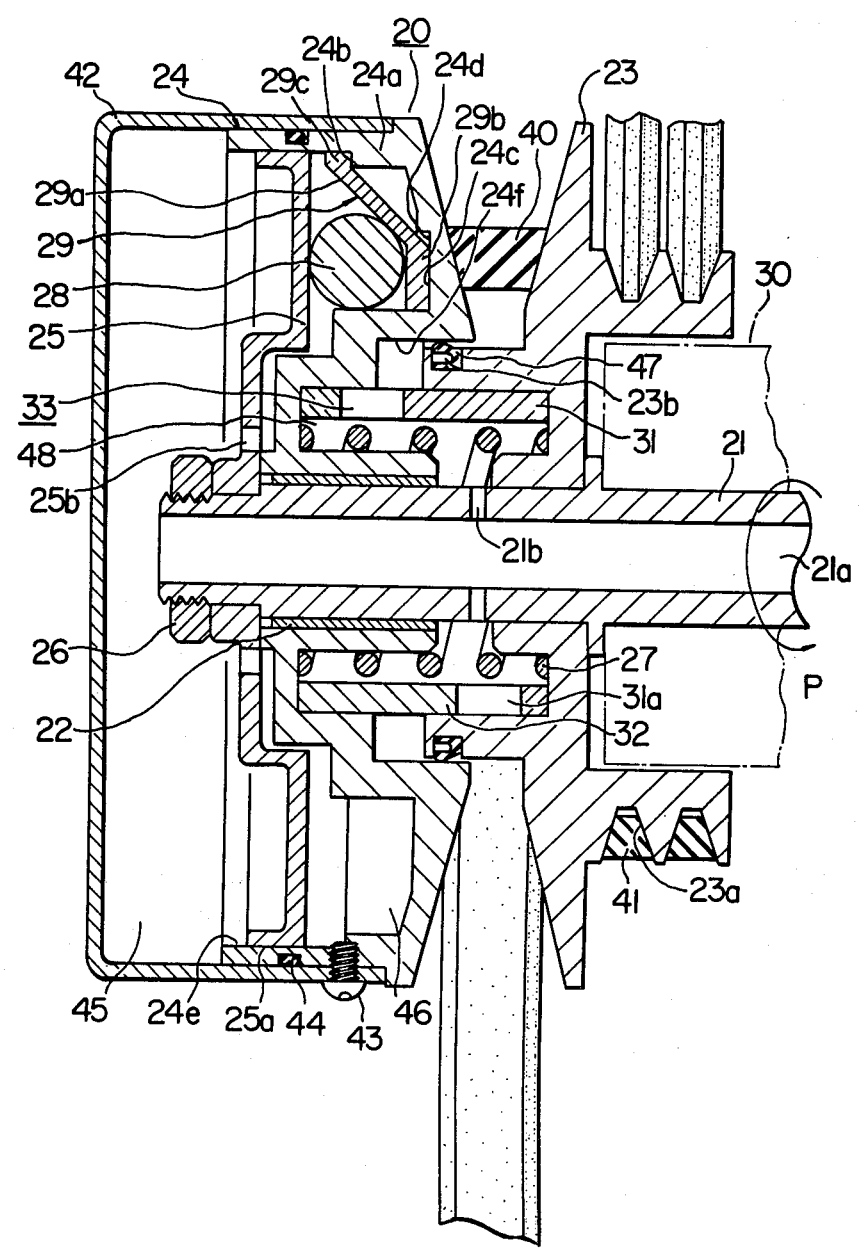

Referring now to FIG. 2, a driven shaft 21 is rotatably supported by a bearing box 30 which in turn is adapted to be fixed to the engine block by means of bolts and a suitable fixture, not shown. The end of the driven shaft 21 adjacent to the bearing box extends beyond the bearing box 30. The driven shaft 21 has an axial bore 21a of a diameter of about 10 mm or so extending axially through the shaft over the entire length thereof. The bore 21a is communicated with the atmosphere so that the pressure at the end of the driven shaft 21 adjacent to a cover 42 is maintained at the same level as the atmospheric pressure.

A reference numeral 22 designates a dry bearing which is inserted into a movable pulley part 24 as in the case of the drive pulley unit and is slidable along the driven shaft 21 in the axial direction thereof. A stationary pulley part 23 is fixed to the driven shaft 21 by means of a key which is not shown in the drawings. The stationary pulley 23 is formed in its outer peripheral surface with grooves 23a having V-shaped cross-sections and adapted to receive V-belts 41 for transmitting a power to accessories such as an air pmp, water pump, cooling fan, compressor, alternator and so forth. Although only two grooves 23a are shown in FIG. 2, a greater number of grooves and, hence, V-belts may be employed in the actual power transmission system.

The stationary pulley part 23 and the movable pulley part 24 in combination constitute a driven pulley unit which is generally designated by a reference numeral 20. As in the case of the driving pulley unit 10, the pulley parts of the driven pulley unit 20 are made of an aluminum alloy or the like material of a comparatively light weight and the width of the groove formed between the two pulley parts is variable in accordance with the axial sliding movement of the movable pulley part 24. A pre-loaded spring 27 resiliently biases the movable pulley part 24 away from the stationary pulley part 23, i.e., in the direction to increase the width of the groove in the driven pulley unit 20.

The movable pulley part 24 is provided, at its side opposite to the side thereof contacted by the belt 40, with a cylindrical portion 24a. The cylindrical portion 24a has an inner peripheral surface on which a step or shoulder 24b is formed to provide an annular surface which extends radially of the driven shaft 21. Three recesses 24d are formed at a constant circumferential pitch in the portion of the movable pulley part 24 which is radially inward of the shoulder 24b and offset therefrom toward the belt 40 in the axial direction of the driven shaft 21. The bottom of each recess 24d constitutes a radial plane 24c which coincides with a radial plane of the driven shaft 21.

Figure 3:
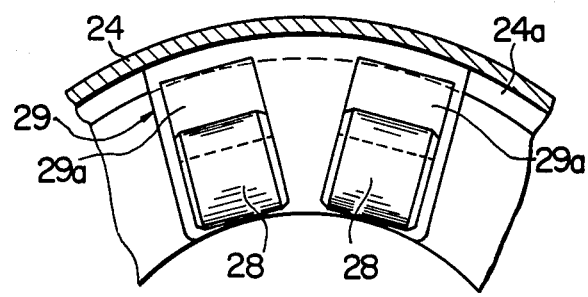
FIG. 3 is a front elevational view of a part of the power transmission system shown in FIG. 1, showing fly weights and associated parts.

As will be seen in FIG. 3, each recess 24d of the movable pulley part 24 receives a holder 29 such that the inner and outer peripheral edge portions 29b, 29c are engaged with the radial plane 24c and the first-mentioned radial plane of the shoulder 24b. Each holder 29 has an arcuate shape as illustrated in FIG. 3 to follow the curvature of the movable pulley part 24. Two inclined surfaces 29a are formed on the holder 29 and extend in the radial direction of the movable pulley part 24. A stationary plate 25 is fixed to the driven shaft 21 by means of a nut 26 and covers the holders 29. This stationary plate 25 is rotatable together with the driven shaft 21 but is prevented from moving in the axial direction thereof.

Fly weights 28 are disposed between the stationary plate 25 and the inclined surfaces 29a of each holder 29 and are in contact with these members 25 and 29. The arrangement is such that each fly weight rotates together with the movable pulley part 24 and is displaced radially outwardly by the centrifugal force to push the associated holder 29 in the axial direction. Thus, the fly weight is required to have a predetermined mass to generate the axial thrusting force.

The cover 42 is fixed to the outer peripheral surface of the movable pulley part 24 by means of small screws 43 or the like. An "O" ring 44 is fitted in an annular groove formed in the outer peripheral surface of the movable pulley part 24 and provides an effective seal between the outer peripheral surface of the movable pulley part 24 and the inner peripheral surface of the cover 42 to prevent lubricating oil from escaping from the sliding areas between the fly weights 28 and the holders 29 and between the fly weights 28 and the stationary plate 25. The stationary plate 25 is received in the bore of the cylindrical portion 24a of the movable pulley part 24 such that a slight gap is preserved between the inner peripheral surface 24e of the cylindrical portion 24a and the outer peripheral surface 25a of the stationary plate 25. Although not shown, a labyrinth is formed on the outer peripheral surface 25a of the stationary plate 25 to prevent the lubricating oil from being scattered from the area around the fly weights 28.

A communication port 25b is formed in the stationary plate 25a near the center thereof to provide a communication between a first space 45 defined between the stationary plate 25 and the cover 42 and a second space 46 defined between the stationary plate 25 and the movable pulley part 24. The first space 45 is communicated with the atmosphere through the central axial bore 21a extending through the driven shaft 21.

Figure 4:
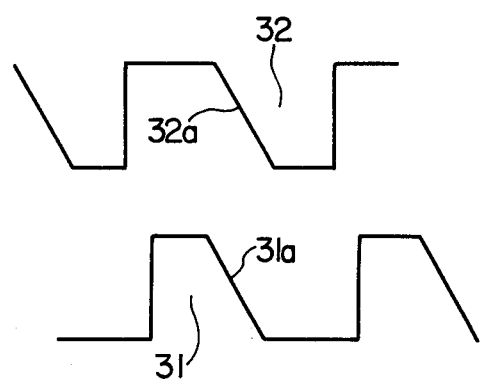
FIG. 4 is a developed view of a cam mechanism incorporated in the driven pulley unit shown in FIG. 2.

A stationary cam 31 is fixed to the stationary pulley part 23 and has a cam surface 31a formed at a suitable inclination determined by a calculation as in the case of the stationary cam 17 of the driving pulley unit 10, as will be seen from FIG. 4. It is to be noted, however, that the cam surface 31a is inclined in the direction opposite to the direction of the cam surface 17a of the stationary cam 17 of the driving pulley unit 10. A movable cam 32 is fixed to the movable pulley part 24 and has a cam surface 32a inclined at the same angle as the cam surface 31a of the stationary cam 31. The cams 31 and 32 in combination form a cam mechanism 33 of the driven pulley unit 20. As in the case of the cams 17 and 18 of the driving pulley unit, the cams 31 and 32 of the driven pulley unit are made of a material having a sufficient durability and wear-resistant property.

A reference numeral 47 designates a seal ring fitting in an annular groove 23b formed in the stationary pulley part 23. The outer peripheral surface of the seal ring 47 is in sliding contact with the inner peripheral surface 24f of the movable pulley part 24 to provide an effective seal which prevents the lubricating oil from escaping to the outside from the area around the cam surfaces 32a and 31a of the movable and stationary cams 32 and 31. A third space 48 accomodating the cams 31 and 32 and the spring 27 is communicated with the axial bore 21a in the driven shaft 21 through a communication port 21b extending through the thickness of the wall of the driven shaft 21 at a portion thereof aligned with the third space 48.

The aforementioned power transmitting V-belt 40 extends around the driving pulley unit 10 and the driven pulley unit 20 to transmit the torque from the pulley unit 10 to the pulley unit 20. The V-belt is usually made of a rubber reinforced with a strong core material.

The power transmission system of the invention having the described construction operates in a manner explained hereinunder.

As the engine is accelerated from the idling speed, the rotational speed of the driving pulley unit 10 and, hence, the rotational speed of the driven pulley unit 20 are increased, so that the centrifugal force acting on the fly weights 28 is increased correspondingly, with a resultant increase in the force component which tends to displace the fly weights radially outwardly against the inclined surfaces 29a of the holders 29 and axially shift them together with the movable pulley part 24 toward the stationary pulley part 23. The radial outward displacement of the fly weights and the axial displacement of the movable pulley part 24, however, do not take place until the sum of the forces of the springs 16 and 27 is overcome by the force component which is produced by the centrifugal force on the fly weights 28 and tends to axially displace the movable pulley part 24. Thus, the power transmission is carried out at a constant speed change ratio.

As the axial thrust force caused by the centrifugal force of the fly weights and acting on the movable pulley part 24 exceeds the sum of the biasing forces of the springs 16 and 27, the movable pulley part 24 is moved toward the stationary pulley part 23, so that the width of the groove formed between the pulley parts 23 and 24 of the driven pulley unit 20 is decreased to increase the diameter of the circle along which the V-belt 40 is frictionally and drivingly engaged with the pullye unit 20. This increase in the effective diameter of the driven pulley unit 20 naturally increases the tension applied to the belt 40, so that the belt 40 comes deeper into the groove in the driving pulley unit 10 by forcibly displacing the movable pulley part 13 away from the stationary pulley part 14, so that the effective diameter of the driving pulley unit 10 is decreased.

Thus, the effective diameters or the distances between the points of contact of the belt with the pulley parts and the axes of the shafts are gradually varied in both pulley units 10 and 20 so that a substantially constant rotational speed is maintained at the driven pulley unit 20 irrespective of change of the rotational speed of the driving pulley unit 10.

As the engine speed is further increased, the width of the groove in the driving pulley unit 10 is maximized to minimize the effective diameter thereof, while the groove width in the driven pulley unit 20 is decreased to the minimum to maximize the effective diameter thereof. Thus, the maximum reduction ratio is obtained and, thereafter, the rotational speed of the driven pulley unit 20 is increased in proportion to the rotational speed of the driving pulley unit 10, i.e., the engine speed. In other words, the torque of the engine is transmitted to the driven pulley unit 20 at the constant maximum speed reduction ratio.

Hereinafter, an explanation will be made as to the operation of the cam mechanism 33.

A sudden increase in the load of an accessory, which is imposed on the driven pulley unit 20 through the V-belts 41, causes a corresponding increase in the axial load acting on the cam surfaces 31a and 32a of the cams 31 and 32 of the cam mechanism 33. More specifically, these cam surfaces are inclined relative to the axis of the driven shaft 21, as shown in FIG. 4, an axial force is generated by the sudden increase in the load of the accessory to add to the force of the spring 27 which tends to increase the width of the groove in the driven pulley unit 20. Thus, when the load of the accessory is increased abruptly, the cam mechanism 33 acts to produce an axial force to assist the spring 27 so that the effective diameter of the driven pulley unit 20 is decreased. This is effective to reduce the variation in the rotational speed of the driven pulley unit 20 which would be caused by the abrupt change of the load of the accessory.

According to the invention, the first to the third spaces 45, 46, 48 are communicated with the atmosphere through the axial bore 21a in the driven shaft 21 and through the communication ports 21b and 25b. This provides the following advantages:

Assuming here that the first to third spaces 45, 46, and 48 were completely closed and isolated from one another, the pressures in these spaces are changed due to the change of volumes of these spaces caused by the axial movement of the movable pulley part 24. Such changes of pressure inconveniently will modify the power transmission or speed changing characteristic of the power transmission system from the predetermined desired characteristic because the force required for the axial displacement of the movable pulley part 24 is undesirably changed due to such pressure changes.

In addition, if the first to third spaces 45, 46 and 48 were completely closed, the oil seal 47, which is provided for preventing the lubricant from escaping from the sliding area of the cams 31 and 32, is subjected to a high pressure created in these spaces due to the change of the volumes thereof. In the worst case, the oil seal 47 may be broken to permit the lubricating oil to leak to the outside resulting in sticking between the sliding parts of the cams 31 and 32.

Furthermore, if the first to third spaces 45, 46 and 48 were completely closed, the air confined in these spaces is inflated to increase the internal pressure. This is particularly true with the case where the temperature of the driven pulley unit 20 is elevated due to a rise of the ambient air temperature or an increase of the load imposed by an accessory.

These problems, however, are overcome in the present invention thanks to the provision of the axial central bore 21a in the driven shaft 21, the communication port 25b formed at a central portion of the stationary plate 25 and the communication port 21b formed in the wall of the driven shaft 21. Namely, the first space 45 is communicated with the atmosphere through the axial bore 21a in the driven shaft 21, the second space 46 is communicated with the first space 45 through the communication port 25b and the third space 48 is communicated with the atmosphere through the communication port 21b and the axial bore 21a. Thus, the first to third spaces 45, 46 and 48 are always kept in communication with the atmosphere and the pressures in these spaces are maintained substantially at the same levels as the atmospheric pressure. Therefore, the predetermined speed changing characteristic is maintained irrespective of the change in the volumes of the spaces 45, 46 and 48 and the change in the temperature of the driven pulley unit 20.

In addition, since the axial bore 21a and the communication ports 21b and 25b are formed along and in the vicinity of the axis of the driven shaft, respectively, the lubricating oil is concentrated to the radially outer parts of the pulley unit by the action of the centrifugal force produced during the operation. This means that the spaces near the axial bore 21a and the communication ports 21b and 25b are occupied wholly by air, so that the leakage of the lubricating oil through these bore and ports can surely be avoided to eliminate various troubles attributable to the escape of the lubrication oil.

The described embodiment is for the illustrative purpose only and the invention is not limited to this embodiment. Rather, various changes and modifications are possible as discussed below by way of example:

In the described embodiment, the communication of the inner spaces 45, 46 and 48 with the atmosphere is through the axial central bore 21a in the driven shaft 21. However, it is not essential to provide this passage 21a in the driven shaft 21. The passage can be formed anywhere in the vicinity of the axis of the driven shaft 21. For instance, it is possible to establish the communication of the mentioned spaces with the atmosphere through a communication port formed in a central portion of the cover 42 or of the stationary pulley part 23.

It will be apparent to those skilled in the art that an axial bore similar to the axial bore 21a in the driven shaft 21 may be formed also in the drive shaft 1 for a similar purpose.

The fly weights 28, which are incorporated in the driven pulley unit 20, may alternatively be incorporated in the drive pulley unit 10.

Needless to say, the power transmission system of the invention can be applied to other various uses than the described power transmission between an automobile engine and engine accessories. In the case where a single accessory only is driven by the driven pulley unit 20, the V-shaped grooves 23a may be eliminated and the single accessory may be connected directly to the driven shaft 21.

What is claimed is:

1. A power transmission system comprising:
a shaft; a stationary pulley part fixed to said shaft; a movable pulley part disposed in axially opposite relationship to said stationary pulley part and movable in the axial direction along said shaft toward and away from said stationary pulley part to vary the width of a belt-receiving groove formed between said stationary and movable pulley parts; a V-belt received in said belt-receiving groove; a holder fixed to the side of said movable pulley part opposite to the side thereof which is contacted by said V-belt, said holder having an inclined surface extending obliquely with respect to the axis of said shaft; a circular stationary plate fixed to said shaft and disposed axially outwardly of said holder; at least one fly weight held between said stationary plate and said holder; a cover having an end wall disposed axially outwardly of said stationary plate and having a substantially cylindrical outer peripheral section sealingly and fixedly connected to said movable pulley part, said cover cooperating with said stationary plate to define a first variable volume space therebetween, means providing a seal between said stationary plate and said movable pulley part, said seal means allowing an axial movement of said movable pulley part and said cover relative to said stationary plate, said stationary plate cooperating with said movable pulley part to define a second variable volume space therebetween, said movable and stationary pulley part cooperating together to define a third variable volume space therebetween; means for communicating said first, second and third spaces with the atmosphere to maintain said spaces substantially at the atmospheric pressure.

2. A power transmission system according to claim 1, wherein said communicating means comprises a first communication port formed in said stationary plate to provide a communication between said first and second spaces, an axial bore formed axially in said shaft to provide a communication between said first space and the atmosphere and a second communication port formed substantially radially in said shaft to provide a communication between said third space and said axial bore.

3. A power transmission system according to claim 2, wherein said first communication port is formed in said stationary plate adjacent to said shaft.

* * * * *